(12) United States Patent
Arzner

(10) Patent No.: US 9,671,005 B2
(45) Date of Patent: Jun. 6, 2017

(54) TRANSMISSION DEVICE AND DRIVE TRAIN OF A VEHICLE

(71) Applicant: ZF Friedrichshafen AG, Friedrichshafen (DE)

(72) Inventor: Matthias Arzner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 205 days.

(21) Appl. No.: 14/490,742

(22) Filed: Sep. 19, 2014

(65) Prior Publication Data

US 2015/0080167 A1 Mar. 19, 2015

(30) Foreign Application Priority Data

Sep. 19, 2013 (DE) .................. 10 2013 218 779

(51) Int. Cl.
*F16H 48/24* (2006.01)
*B60K 17/16* (2006.01)
*B60K 23/08* (2006.01)
*B60K 17/35* (2006.01)
*F16D 11/04* (2006.01)

(52) U.S. Cl.
CPC .......... *F16H 48/24* (2013.01); *B60K 17/165* (2013.01); *B60K 17/35* (2013.01); *B60K 23/08* (2013.01); *B60K 2023/0833* (2013.01); *F16D 11/04* (2013.01)

(58) Field of Classification Search
None
See application file for complete search history.

(56) References Cited

U.S. PATENT DOCUMENTS 5,105,901 A 4/1992 Watanabe et al.

FOREIGN PATENT DOCUMENTS

WO WO 2009/127324 10/2009

*Primary Examiner* — Colby M Hansen
(74) *Attorney, Agent, or Firm* — Dority & Manning, P.A.

(57) ABSTRACT

A transmission includes a first shaft connected to a differential transmission by a differential carrier. The differential transmission includes a first and a second differential shaft, wherein the second differential shaft is an output shaft. A shift element that includes a sliding element is used to couple the first differential shaft to the output shaft. The sliding element is connected in a torque-proof manner to the differential carrier and is axially movable relative to the differential carrier by a spring to produce a positive-locking connection between the first differential shaft and the output shaft. The first differential shaft has a movable area that moves axially with the shift element into a positive-locking connection with an area of the output shaft. The movable area of the first differential shaft is rotatable relative to the sliding element.

11 Claims, 4 Drawing Sheets

TRANSMISSION DEVICE AND DRIVE TRAIN OF A VEHICLE

The invention relates to a transmission device and a vehicle drive train with a differential transmission device, which is in operative connection with a first shaft in the area of a differential cage, and with two differential shafts, of which at least one is able to be coupled with an output shaft through a shifting element that is able to be actuated through an actuator device.

BACKGROUND

A vehicle drive train with two drivable vehicle axles is known from WO 2009/127324 A2. The vehicle drive train comprises a transmission, coupled with a drive motor and/or a drive unit and designed as a gear wheel shift transmission, with several shiftable transmission stages, along with a first differential gear coupled with the gear wheel shift transmission, which is coupled with the wheels of a first drivable vehicle axle through two first drive shafts. The first drivable vehicle axle is constantly driven, and represents a driven front vehicle axle. Furthermore, a transfer gearbox and/or transfer device coupled with the first differential gear is provided, which is coupled through a connection shaft with a second differential gear, which is in turn in operative connection with the wheels of a second drivable vehicle axle through additional drive shafts. The operative connection between the first differential gear and the transfer gearbox can be separated at the wheels of the two drivable vehicle axles by means of a shiftable clutch for the interruption of a transfer fo the driving force and the turning moment. This shiftable clutch is arranged between the first differential gear and the transfer gearbox.

Depending on the operating state, uncoupling the part of the vehicle drive train leading in the direction of the second drivable vehicle axle uncouples in the immediate vicinity of the gear wheel shift transmission through the actuation of the shiftable clutch. In order to minimize the friction losses of the partial drive train that is uncoupled by means of the shifting clutch and, in this shifting position, is not in operative connection with the rest of the drive train, additional clutches are provided in the area of the drive shafts of the two drivable vehicle axles. In the open operating state of the additional clutches, the non-driven partial drive train between the transfer gearbox and the additional clutches comes to a standstill.

Disadvantageously, when the vehicle drive train is operated during an open operating state of the two additional clutches between the halves of the shifting element of the additional clutches designed as friction-locking clutches, there are differential rotational speeds that cause unwanted drag torques and impair the efficiency of the vehicle drive train and increase the fuel consumption of a drive motor designed as an internal combustion engine.

Furthermore, a four-wheel drive system with a drive unit, a main transmission for displaying different transmission ratios along with a differential gear provided in the area of a first drivable vehicle axle for distributing the drive force between the two drive wheels is known from DE 40 39 392 A1. A second drivable vehicle axle is able to be brought into operative connection with the drive unit through a decoupler. The turning moment (torque) value that is able to be led through the decoupler in the direction of the second drivable vehicle axle is diverted through a bevel gearbox in a vehicle transverse direction and is able to be led through wheel couplings in the direction of the drive wheels of the second drivable vehicle axle.

Depending on the respective operating status of the four-wheel-drive system, the decoupler for decoupling the second drivable vehicle axle is opened. In order to reduce friction losses in the area of the bevel gearbox, wheel couplings that are additionally arranged in the area between the bevel gearbox and the drive wheels of the second drivable vehicle axle are likewise opened. In turn, differential rotational speeds present between the halves of the shifting element of the opened friction-locking wheel couplings have drag losses.

For the further reduction of the power losses, positive-locking shifting elements instead of friction-locking shifting elements are provided in the area of vehicle drive trains, through which the side shaft separator known from the state of the art is possible in the area of a drivable vehicle axle. Moreover, with such vehicle drive trains, the supporting connection in the open operating state of the positive-locking shifting element is separated between a differential shaft of a differential gear and the associated wheel. Thus, the shutdown of a so-called "cardan drive" with the accompanying standstill of a cardan shaft and/or a shaft connected to a transfer box with the differential gear, a set of bevel wheels on the differential gear along with a crown wheel carrier and/or a differential carrier is enabled.

At vehicle speeds greater than zero, in the coupled condition and/or upon a rotational speed of a crown wheel and of the differential carrier connected with it of essentially zero, there is a rotational speed compensation in the area of the differential gear. During the rotational speed compensation, the two halves of the shifting element of the open positive-locking shifting element in the area between the differential shaft and an output shaft leading in the direction of the wheel rotates with the wheel rotational speed, whereas, the halves of the shifting element circulate with the opposing direction of rotation. Thereby, during a driving operation, a control sleeve of the positive-locking shifting element coupled to one of the shafts always undergoes a rotational movement. This leads to the fact that, for the actuation of the control sleeve between an open operating state of the positive-locking shifting element and a closed operating state of the positive-locking shifting element, stationary actuator devices are exposed to a high degree of mechanical wear based on the permanently present differential rotational speed between the rotating control sleeve and the actuator device.

In order to design a shiftable four-wheel drive of a vehicle with a desired long service life, a correspondingly high structural expenditure is to therefore be provided in the area of one or more shiftable shifting elements and the actuator devices allocated to each of them, yet, due to reasons of installation space and costs, this is not desired.

SUMMARY OF THE INVENTION

Therefore, the present invention is subject to the task of providing a transmission device and a vehicle drive train with at least two drivable vehicle axles, which are small, cost-effective, and operable with a high degree of efficiency over a desired duration. Additional objects and advantages of the invention will be set forth in part in the following description, or may be obvious from the description, or may be learned through practice of the invention. In accordance with the invention, the tasks are achieved with a transmission device and a vehicle drive train with the characteristics set forth herein.

The transmission device in accordance with the invention is designed with a differential transmission device, which is in operative connection with a first shaft in the area of a differential carrier. Furthermore, the transmission device includes two differential shafts, of which at least one is able to be coupled with an output shaft through a shifting element actuated by an actuator device.

In accordance with the invention, one shifting element half of the shifting element features a sliding element that is connected in a torque-proof manner to the differential carrier and is axially movable by the actuator device with respect to the differential carrier. Through axial movement of the sliding element on the side of the actuator device, a positive-locking connection is able to be coupled and uncoupled between the differential shaft and the output shaft between an area on the component configured on the differential shaft that is axially movable together with the sliding element, the component defining the movable area is connected in a torque-proof manner to the differential shaft, and an area of the output shaft, whereas the movable area component of the differential shaft is able to be rotated in respect of the sliding element.

During an operating state of the transmission device in accordance with the invention in which a rotational speed of the differential carrier is essentially equal to zero, the sliding element is at a standstill, and is able to be actuated by the actuator device without wear. The actuator device is preferably stationary. This is achieved in a structurally simple manner through the rotation decoupling provided in the area between the sliding element and the area of the differential shaft that is axially movable together with the sliding element. Through the rotation decoupling, with an active side shaft separator, the specified rotational speed compensation in the area of a differential gear is possible without an undesired high degree of mechanical wear in the area of an operative connection between the actuator device and the sliding element.

With an embodiment of the transmission device in accordance with the invention that engages a control cam of the sliding element. The sliding element rotates with the differential carrier and shifts counter to a spring force of a spring device applying at the sliding element into an axial end position, which is equivalent to a separate operating state of the positive-locking connection.

The spring device shifts the sliding element for an embodiment of the transmission device in accordance with the invention that is able to be actuated with a low control and governing effort with a control element arranged outside of the control cam into a further axial end position, which is equivalent to a closed operating state of the positive-locking connection.

If an axial bearing device is provided between the sliding element and the movable area of the differential shaft, actuating forces introduced by the actuator device into the sliding element are transferable in a desired extent with low power losses to the movable area of the differential shaft.

The transmission device is characterized by a low component count, if the movable area of the differential shaft is axially movable together with the differential shaft.

With an alternative embodiment of the transmission device in accordance with the invention, the movable area is movably connected to the differential shaft, by which shifting forces for shifting the positive-locking connection are themselves able to be generated essentially depending on the design of the differential shaft and the differential transmission device.

With a transmission device in accordance with the invention that is likewise favorable for installation space, the movable area of the differential shaft at least partially overlaps the differential carrier at least in the open operating state of the positive-locking connection between the differential shaft and the output shaft in a radial direction.

The transmission device in accordance with the invention is also characterized by a small installation space requirement if the movable area of the differential shaft is arranged radially within the sliding element, at least in areas.

In order to, in a simple manner, prevent or reduce shifting noise that impairs driver comfort in the operation of the transmission device, the transmission device in accordance with the invention is, with a further embodiment, designed with a stop dampening device between the movable area of the differential shaft and the output shaft, by means of which the one actuation movement of the movable area in the direction of the further axial end position is able to be dampened upon reaching the further axial end position.

Thereby, the actuator device, the sliding element with the control cam and the stop dampening device can be designed in the manner described in DE 10 2012 210 298.1.

For the vehicle drive train in accordance with the invention with at least two drivable vehicle axles, one drive unit, one transmission for displaying multiple transmission ratios and one transfer gearbox, the transmission connects with the vehicle axle through the gearbox. The transfer gearbox is arranged in the power flow between the transmission and at least one of the vehicle axles and is connected to a differential carrier of the described transmission device in accordance with the invention provided in the area of the vehicle axle shiftable through the transfer gearbox as a transverse transfer gearbox.

With a vehicle drive train in accordance with the invention the rotational speed of the differential carrier of the transmission device is essentially zero through the uncoupling of the vehicle axle designed with the transmission device in accordance with the invention from the power flow of the vehicle drive train. Thus, the positive-locking connection between the differential shaft of the transmission device and the output shaft of the transmission device is shiftable with low wear, and both the transmission device and the vehicle drive train are operable with low structural expense and low required installation space for a switched-off all-wheel drive with low power losses of the vehicle drive train.

With an embodiment of the vehicle drive train in accordance with the invention that is favorable for installation space, the transfer gearbox is designed with a friction-locking shifting element, whereas, in an open operating state of the friction-locking shifting element of the transfer gearbox, the shiftable vehicle axle is separated from the transmission and is present in its switched-off operating state.

Thus shifting the switched-on vehicle axle through a corresponding control and/or governing of the transfer capacity of the friction-locking shifting element of the transfer gearbox into an operating state necessary for the all-wheel operation, which corresponds at least approximately to a synchronous operating state, the positive-locking connection between the differential shaft and the output shaft is transferable, and thus shiftable with low shifting forces.

Both the characteristics specified in the patent claims and the characteristics specified in the subsequent embodiments of the transmission device and the vehicle drive train in accordance with the invention are, by themselves alone or in any combination with one another, suitable for providing additional forms for the object under the invention. In terms of the additional forms of the object under the invention, the particular combinations of characteristics do not represent a limitation; rather, they are essentially solely of an exemplary nature.

Additional benefits and advantageous embodiments of the transmission device in accordance with the invention and/or the vehicle drive train in accordance with the invention arise from the patent claims and the embodiments described below, with reference to the drawing in terms of principle, whereas, in the description of the various embodiments, in the interests of clarity, the same reference signs are used for structurally equivalent and functionally equivalent components.

BRIEF DESCRIPTION OF THE DRAWINGS

The following is shown:

FIG. 1 a schematic representation of a vehicle drive train with a transmission device with a differential transmission device and with an all-wheel drive that is able to be switched on;

DETAILED DESCRIPTION

Figure 1:
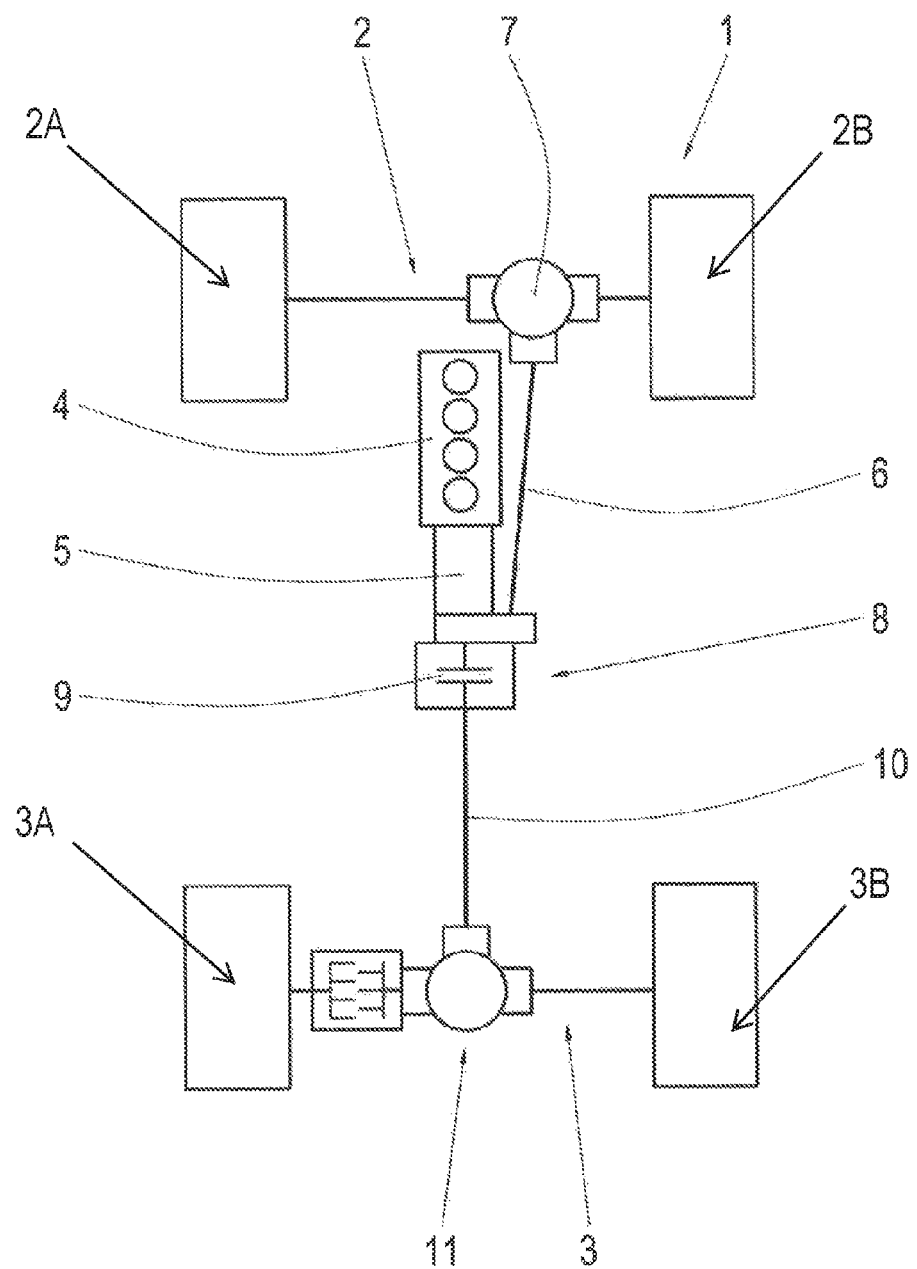

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a vehicle drive train 1 that is operable in the manner described below, either with one drivable vehicle axle 2 or with two drivable vehicle axles 2, 3 in an all-wheel operating mode. A drive unit 4 and a downstream transmission 5 and/or a main transmission are, in this case, installed in the vehicle in a "front longitudinal arrangement," for driving drive wheels and/or front wheels 2A, 2B of the first drivable vehicle axle 2, which in this case represents the permanently driven primary axle of the vehicle drive train 1. The drive power of the drive unit 4, designed in this case as an internal combustion engine, is correspondingly modulated in the downstream main transmission 5, and is subsequently forwarded at least partially through a cardan shaft 6 in the direction of an axle differential transmission 7 of the vehicle axle 2. In the area of the axle differential transmission 7, in a known manner, the turning moment applied through the cardan shaft 6 is distributed between the two front wheels 2A and 2B in a vehicle transverse direction.

In addition, the vehicle drive train 1 features a transfer gearbox 8, in the area of which a power flow is able to be produced or interrupted, depending on the request, in the direction of the vehicle axle 3 or the rear vehicle axle, as the case may be. In this case, the secondary axle represents the rear vehicle axle and is switched on according to need through a shifting element 9. However, there is also the option that the rear vehicle axle is the primary axle, and the front vehicle axle of the vehicle drive train 1 is the secondary axle.

Through the shifting element 9, the main transmission 5 is able to be brought into operative connection with a vehicle longitudinal shaft 10, which is connected to a transmission device 11 in the area of the vehicle axle 3, if there is a corresponding request for displaying the all-wheel operating mode. In order to disable the all-wheel distribution operation of the vehicle drive train 1, the power flow between the drive unit 4 and the rear vehicle axle 3 in the area of the transfer gearbox 8 is interrupted by the opening of the shifting element 9. In order to avoid the drag torques that arise during the continuous rotation of the components of the vehicle drive train 1 arranged in the power flow between the main transmission 5 and the drive wheels 3A and 3B of the rear vehicle axle 3, the vehicle longitudinal shaft 10 and the components of the transmission device 11 shown in more detail in FIG. 2 to FIG. 4 are brought to a standstill in the described manner.

Figure 2:
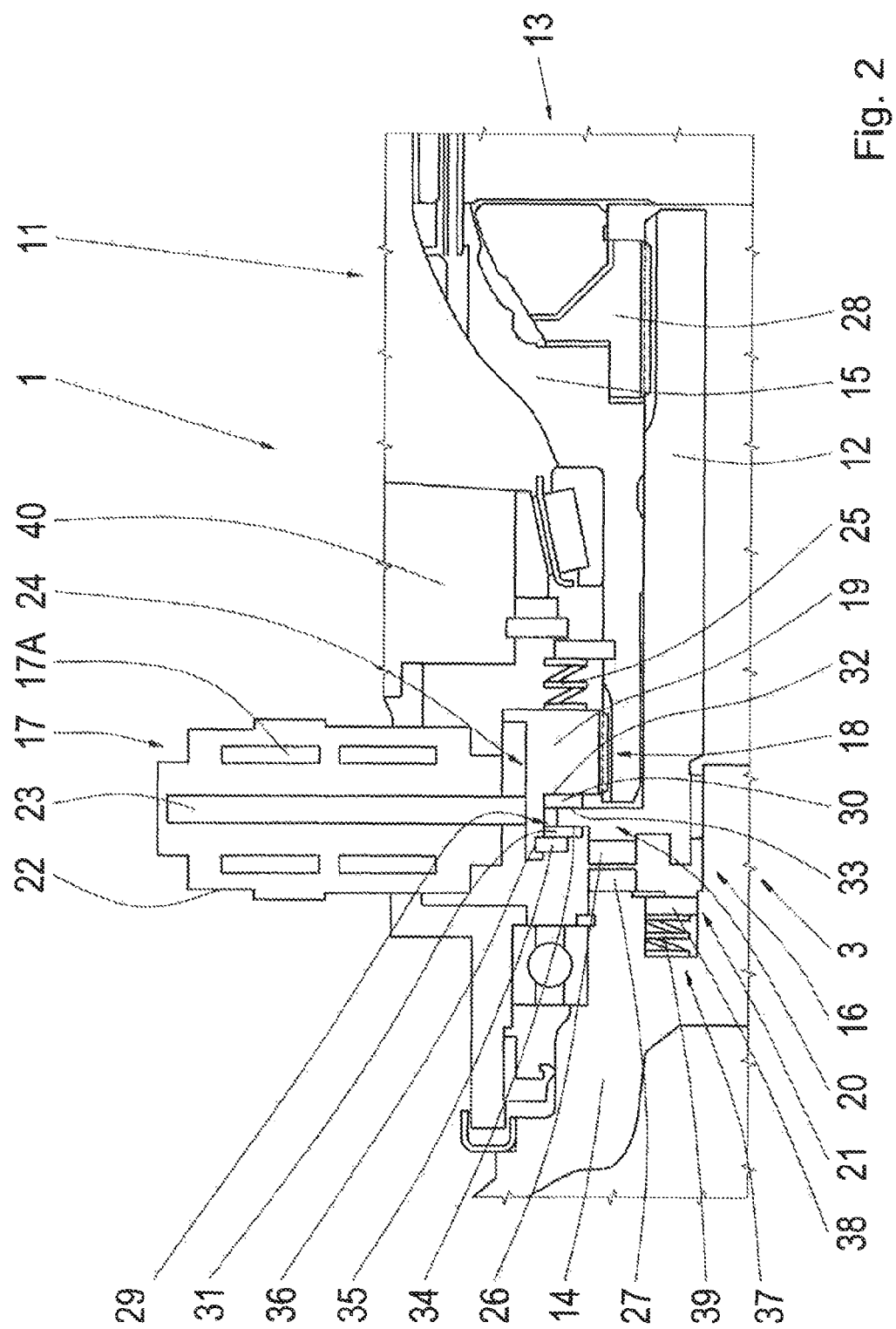
FIG. 2 an enlarged individual view of an area II more specifically described in FIG. 1, with a first embodiment of the transmission device, with a shiftable positive-locking shifting element in an open operating state.
Figure 3:
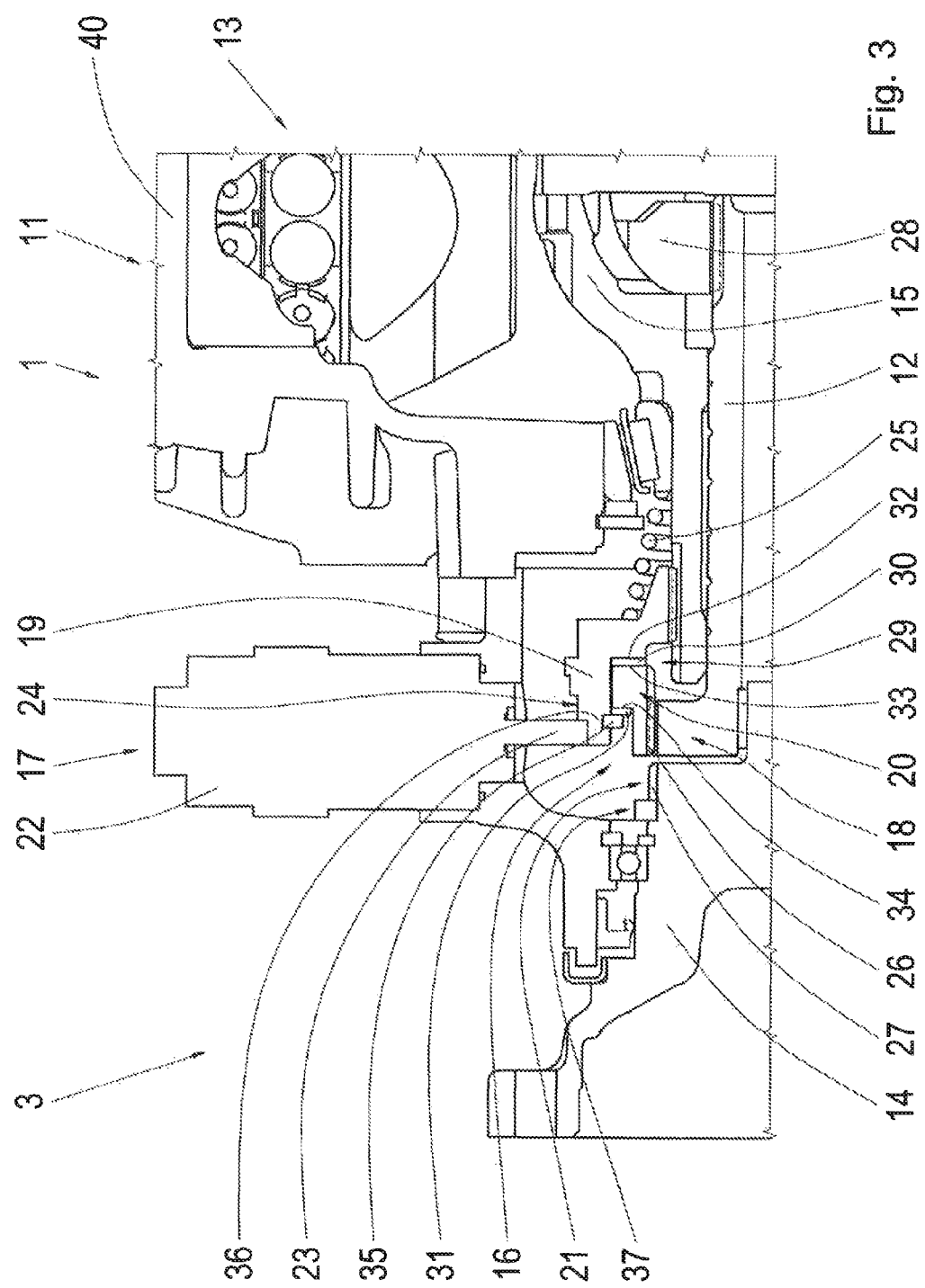
FIG. 3 a representation corresponding to FIG. 2 of a second embodiment of the transmission device for a positive-locking shifting element present in an open operating state.
Figure 4:
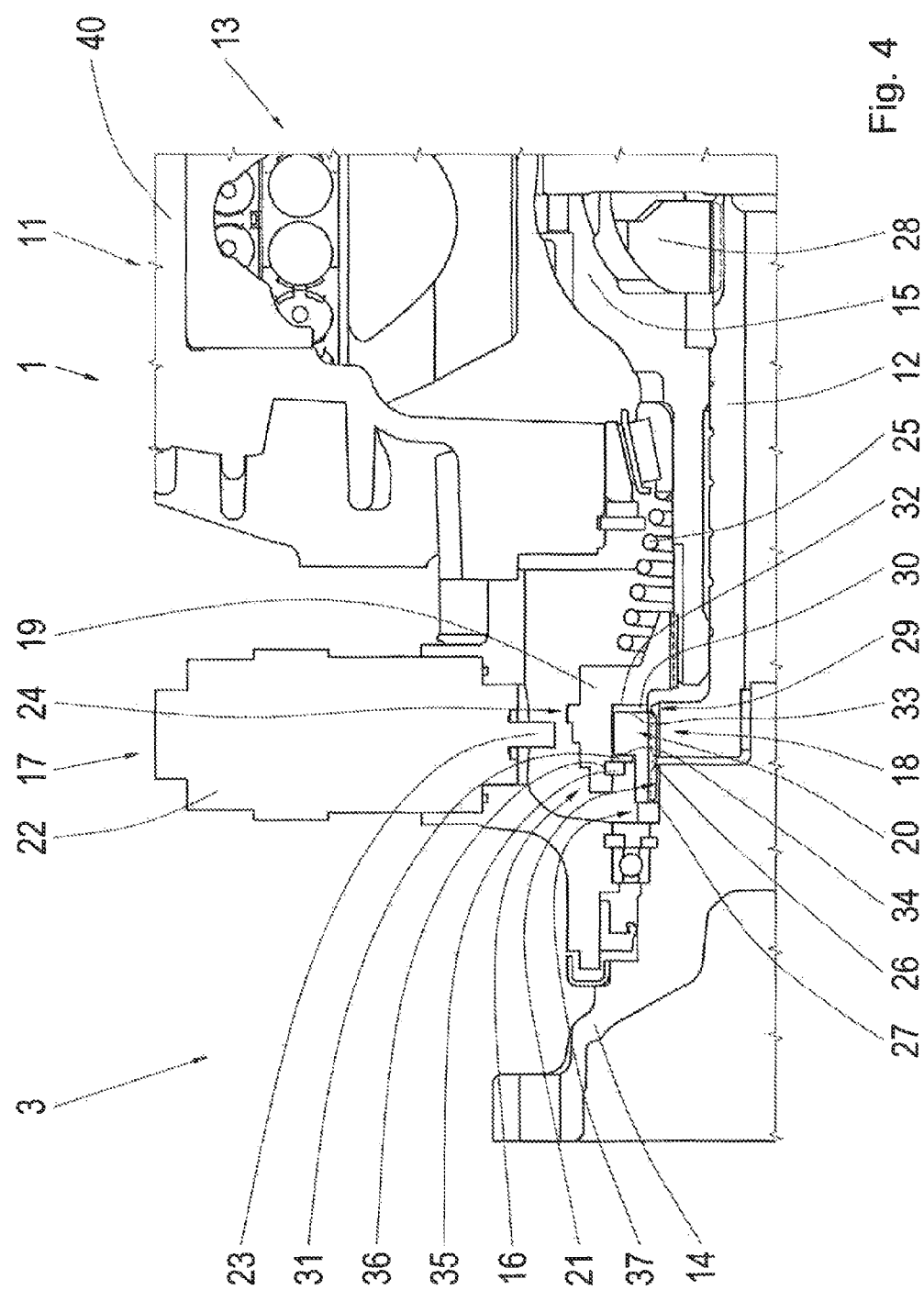
FIG. 4 the transmission device according to FIG. 3 with an open positive-locking shifting element.

If the shifting element 9 is transferred into its open operating state in order to switch off the all-wheel operating mode, a positive-locking connection is opened between a differential shaft 12 of a differential transmission device 13 of the transmission device 11, as presented in more detail in FIG. 2 to FIG. 4, and an output shaft 14 of the transmission device 11. The differential transmission device 13 is connected in the area of a differential carrier 15 to the vehicle longitudinal shaft 10 in a known manner (e.g., via a gear tooth system). For opening and closing the positive-locking connection between the differential shaft 12 and the output shaft 14, in this case, a positive-locking shifting element 16 is provided, which is able to be actuated through an actuator device 17. One shifting element half 18 of the positive-locking shifting element 16 features a sliding element 19 rotatably connected to the differential carrier 15 and axially movable by the actuator device 17 with respect to the differential cage 15. Through axial movement of the sliding element on the side of the actuator device, a positive-locking connection is coupled and uncoupled between the differential shaft 12 and the output shaft 14, particularly between an area 20 configured on the differential shaft 12 that is axially movable with the sliding element 19 and an area 21 of the output shaft 14. The sliding element 19 is connected in a torque-proof manner to the differential shaft 12. In this case, the sliding element 19 is also connected in a torque-proof manner to the differential carrier 15 through a spline shaft profile, and connected in an axially movable manner to the differential carrier. In this case, the movable area 20 is coupled in a torque-proof manner with a differential shaft 12 through a spline shaft profile, and designed in a movable manner in an axial direction with respect to the differential shaft 12. In addition, the movable area 20 of the differential shaft 12 is formed in a manner that is able to be twisted with respect to the sliding element 19, and arranged radially within the sliding element 19.

In order to actuate the positive-locking shifting element 16, in this case, the actuator device 17 comprises a control element 23 formed longitudinally in a housing 22 and designed essentially in a pin shape, which is movable by the electromagnet 17A of the actuator device 17 into the axial position shown in FIG. 2, and in this position engages in a control cam 24 of the sliding element 19 provided on the external circumference of the sliding element 19.

If the control element 23 engages in the control cam 24 of the sliding element 19, and the sliding element 19 rotates together with the differential carrier 15, the sliding element 19 is shifted counter to a spring force of a spring device 25 applied at the sliding element 19 into the axial end position shown in FIG. 2. This axial end position is equivalent to an open operating state of the positive-locking connection between the differential shaft 12 and the output shaft 14, in which the spring device 25 exists in a preloaded operating state. The spring device 25 shifts the sliding element 19 when the control element 23 is moved away from of the control cam 24 in a further axial end position, which is equivalent to a closed operating state of the positive-locking connection or of the positive-locking shifting element 16. Both the movable area 20 of the differential shaft 12 and the area 21 of the output shaft 14 are designed in front areas turned towards one another with claws 26 or 27, as the case may be, in the areas of which the positive-locking connection is produced between the differential shaft 12 and the output shaft 14, if the claws 26 and 27 are located in the overlap.

If there is a corresponding request to close the positive-locking shifting element 16, the pin-shaped control element 23 is led from the engagement with the control cam 24 of the sliding element 19 by switching off the power supply of the electromagnet 17A, and the sliding element 19 is transferred, together with the movable area 20 of the differential shaft 12, from the spring device 25 into the axial end position equivalent to the closed operating state of the positive-locking shifting element 16.

While the positive-locking shifting element 16 and the friction-locking shifting element 9 are both open, the differential carrier 15 is at a standstill. At the same time, the output shaft 14 turns with the rotational speed of the connected drive wheel 3A. During such a driving operation, the coupled state of the output shaft 14 shifts the differential compensation in the area of the differential transmission device 13. The differential shaft 12 connected in a torque-proof manner to the movable area 20 rotates with the wheel rotational speed and in a direction opposite the direction of rotation of the output shaft 14. The doubled wheel rotational speed is the differential rotational speed in the area of the open positive-locking shifting element 16 The movable area 20 of the differential shaft 12 is a permanently rotating coupling element, while the sliding element 19, the actuator device 17 designed as a pin actuator, the differential cage 15, and an open positive-locking shifting element 16 with a rotational speed equal to zero are present in the housing 40 of the transmission device 11.

In this case, the movable area 20 is formed in one piece with the differential shaft 12. Upon an axial shifting of the sliding element 19, in order to open or close the positive-locking shifting element, the entire differential shaft 12 is displaced with respect to the differential carrier 15 and a bevel wheel 28 connected in a torque-proof manner to the differential shaft 12. To transfer the axial forces applied at the sliding element from the sliding element 19 to the movable area 20 of the differential shaft 12 with as little loss as possible, an axial bearing device 29, which includes two spacer disks 30, 31, is provided between the sliding element 19 and the movable area 20 of the differential shaft 12. Thereby, the spacer disk 30 is arranged between a front surface 32 of the sliding element 19 and a first front surface 33 of the movable area 20 of the differential shaft 12, while the second spacer disk 31 is held in an axial direction between a second front surface 34 of the movable area 20 and a radial spring washer 35 mounted in an internal groove 36 of the sliding element 19.

A movement of the sliding element 19 and the movable area 20 of the differential shaft 12 in the direction of the further end position, which is equivalent to the closed operating state of the positive-locking shifting element 16, is able to be braked in a damping manner in the area of a stop damping device 37. In this case, the stop damping device 37 includes a damper element 38 designed in rubber-like form, which is spring-loaded through a spring device 39 at the output shaft 14.

FIG. 3 and FIG. 4 show a second embodiment of the transmission device 11, which is essentially distinguished from the embodiment of the transmission device 11 shown in FIG. 2 in that the movable area 20 of the differential shaft 12 is designed as a separate component, which is connected in a torque-proof manner to the differential shaft 12 and is axially movable with respect to the differential shaft 12 that is designed to be axially non-movable.

In the design of the transmission device 11 according to FIG. 3 and FIG. 4, the movable area 20 of the differential shaft 12 at least partially overlaps the differential carrier 15 in a radial direction in an axial position equivalent to the open operating state of the positive-locking shifting element 16, by which the transmission device 11 is designed in a vehicle transverse direction with a small installation space requirement.

For the design of the transmission device 11 according to FIG. 2 and for the second embodiment of the transmission device 11 according to FIG. 3 and FIG. 4 the two-piece design of the first shifting element half 18 of the positive-locking shifting element 16 in the open operating state reduces mechanical stress of the actuator device 17. The sliding element 19 and the differential carrier 15 are at a standstill in the open operating state of the shifting element 9, and the positive-locking shifting element 16 is held in an open operating state by the actuator device 17 or by its control element 23 without a differential rotational speed.

Modifications and variations can be made to the embodiments illustrated or described herein without departing from the scope and spirit of the invention as set forth in the appended claims.

The invention claimed is:

1. A transmission device, comprising:
   a first shaft;
   a differential transmission connected to the first shaft by a differential carrier, the differential transmission further comprising a first differential shaft and a second differential shaft, wherein the second differential shaft is an output shaft;
   an actuator device;
   a shifting element actuated by the actuator device, the shifting element having an open operating state and a closed operating state;
   the shifting element further comprising a sliding element connected in a torque-proof manner to the differential carrier, the sliding element moveable axially relative to the differential carrier by a spring to the closed operating state to produce a positive-locking connection between the first differential shaft and the output shaft, the sliding element engaged and axially moved by the actuator device to the open operating state to uncouple the positive-locking connection between the first differential shaft and the output shaft;
   a movable area configured on the first differential shaft, the movable area axially movable with the shifting element and configured in a torque proof manner relative to the first differential shaft;

the movable area moving into the positive-locking connection with an area of the output shaft upon axial movement of the sliding element to the closed operating state; and the movable area rotatable relative to the sliding element.

2. The transmission device as in claim 1, wherein the actuating device comprises a control element that engages a control cam surface defined on an external circumference of the sliding element to shift the sliding element counter to the spring acting on the shifting element to an axial end position of the shifting element corresponding to the open operating state of the shifting element.

3. The transmission device as in claim 2, wherein upon disengagement of the control element from the control cam surface, the spring moves the sliding element to an opposite axial end position corresponding to the closed-operating state of the shifting element.

4. The transmission device as in claim 3, further comprising a stop damping device positioned to prevent further movement of the sliding element beyond the opposite axial end position.

5. The transmission device as in claim 1, further comprising an axial bearing device between the sliding element and the movable area.

6. The transmission device as in claim 1 wherein the movable area of the first differential shaft is formed as one piece with the first differential shaft such that the differential shaft and movable area move axially together.

7. The transmission device as in claim 1, wherein the movable area is axially movable relative to the first differential shaft.

8. The transmission device as in claim 1, wherein the movable area at least partially overlaps the differential carrier in a radial direction in an open operating state of the positive-locking connection between the first differential shaft and the output shaft.

9. The transmission device as in claim 1, wherein the movable area is configured radially within the sliding element.

10. A vehicle drive train, comprising:
a drive unit;
a primary drive axle and a secondary drive axle, the secondary drive axle having a transmission device;
a transmission that produces multiple transmission ratios to the primary drive axle;
a transfer gearbox operably configured in a power flow between the transmission and the secondary drive axle to selectively couple the secondary drive axle to the transmission;
the transfer gearbox connected to a differential carrier of the transmission device; and
wherein the transmission device is the transmission device of claim 1.

11. The vehicle drive train as in claim 10, wherein the transfer gearbox is configured with a friction-locking shifting element, wherein in an open state of the friction-locking shifting element, the secondary vehicle axle is not coupled to the transmission.

* * * * *